(12) United States Patent
Decaux

(10) Patent No.: US 7,048,851 B2
(45) Date of Patent: May 23, 2006

(54) DEVICE FOR FILTERING DIESEL FUEL THAT IS INTENDED TO SUPPLY A DIESEL ENGINE AND A DIESEL FUEL SUPPLY LINE COMPRISING ONE SUCH DEVICE

(75) Inventor: Daniel Decaux, Blois (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/489,976
(22) PCT Filed: Sep. 18, 2002
(86) PCT No.: PCT/FR02/03191

§ 371 (c)(1),
(2), (4) Date: Aug. 23, 2004

(87) PCT Pub. No.: WO03/025381

PCT Pub. Date: Mar. 27, 2003

(65) Prior Publication Data

US 2005/0016909 A1    Jan. 27, 2005

(30) Foreign Application Priority Data

Sep. 19, 2001   (FR) .................................. 01 12108

(51) Int. Cl.
*B01D 24/00*  (2006.01)
(52) U.S. Cl. ........... 210/186; 210/232; 210/236; 210/416.4; 123/142.5 R; 123/557
(58) Field of Classification Search ........... 210/184, 210/186, 232, 236, 416.4; 123/142.5 R, 123/142.5 E, 198 E, 557

See application file for complete search history.

(56) References Cited

U.S. PATENT DOCUMENTS

| 4,372,260 A * | 2/1983 | Baker ................. 123/142.5 E |
| 4,491,120 A * | 1/1985 | Hodgkins .................... 123/557 |
| 4,596,224 A * | 6/1986 | Prager ........................ 123/557 |
| 4,618,423 A * | 10/1986 | Hodgkins ................... 210/305 |
| 4,650,576 A * | 3/1987 | Leary et al. ................ 210/184 |
| 2005/0005584 A1* | 1/2005 | Decaux ......................... 55/423 |
| 2005/0016909 A1* | 1/2005 | Decaux ....................... 210/184 |

* cited by examiner

*Primary Examiner*—Robert James Popovics
*Assistant Examiner*—T. Woodruff
(74) *Attorney, Agent, or Firm*—David P. Wood

(57) ABSTRACT

A device for filtration of gas-oil intended to supply a diesel engine comprises an electric heating unit which includes a casing internally defining a chamber for heating the gas-oil to be filtered, a filtration unit which includes a casing internally defining a chamber for filtration of the heated gas-oil, means for connecting the heating and filtration chambers and means for assembly of the casings of the heating and filtration units. The connection means include means for directly and tightly connecting the chambers of the said units. The assembly means include means for detachable fixing of the casing of one of the heating and filtration units to the casing of the other of the said units, and means for retention in translation of one of the units relative to the other.

14 Claims, 4 Drawing Sheets

DEVICE FOR FILTERING DIESEL FUEL THAT IS INTENDED TO SUPPLY A DIESEL ENGINE AND A DIESEL FUEL SUPPLY LINE COMPRISING ONE SUCH DEVICE

The present invention relates to a device for filtration of gas-oil intended to supply a diesel engine, of the type defined in the preamble of claim 1.

It preferably applies to the field of low pressure gas-oil supply lines for diesel engines, for example those of vehicles or machines.

This type of filtration device is intended to eliminate from the gas-oil solid impurities such as silica or organic agglomerates, and/or water in emulsion contained in the gas-oil. The performance and longevity of the diesel engine supplied with the gas-oil thus filtered are improved by it.

In addition, gas-oil is sensitive to cold in the sense that when it is stored at temperatures below 0° C., its viscosity increases greatly, making it difficult to filter. In fact, overcold gas-oil applied to a filtration unit risks choking this, for example by waxing it, often irreversibly damaging it. This is why it is known to associate with the filtration unit a unit for electric heating of the gas-oil to be filtered, intended to fluidise the gas-oil when it is used cold.

More precisely, in a gas-oil supply line, it is known to arrange an electrical heating unit to which the filtration unit is connected downstream. Such an arrangement does, however, prove complicated to install within an engine architecture, the heating and filtration units of such a filtration device having to be positioned and fixed at locations limited due to constraints of the size of the engine. In addition, this arrangement requires a connection pipe between the heating organ and the filtration unit, which pipe necessarily causes a risk of leakage and of calorific loss for the gas-oil conveyed by it.

U.S. Pat. No. 4,491,120 describes a device of the type defined above, in which the casings of the heating and filtration units are retained one on the other by spring clips. Such clips present the disadvantages of being difficult to manoeuvre, of running risks of pinching and of limiting the accuracy, tightness and thermal insulation of the connection means connecting the heating and filtration chambers.

The aim of the invention is to propose a device of the above-mentioned type which offers great simplicity of installation, while optimising heating of the gas-oil to be filtered.

To this end, the invention has as its object a device of the above-mentioned type, which has the characteristics of the characterising part of claim 1.

Other characteristics of this device, taken together or in all technically possible combinations, are stated in dependent claims 2 to 13.

The invention also has as its object a gas-oil supply line, in particular for a diesel engine, having the characteristics of claim 14.

The invention will be better understood on reading the following description, given solely by way of example and with reference to the attached drawings in which.

Figure 1:
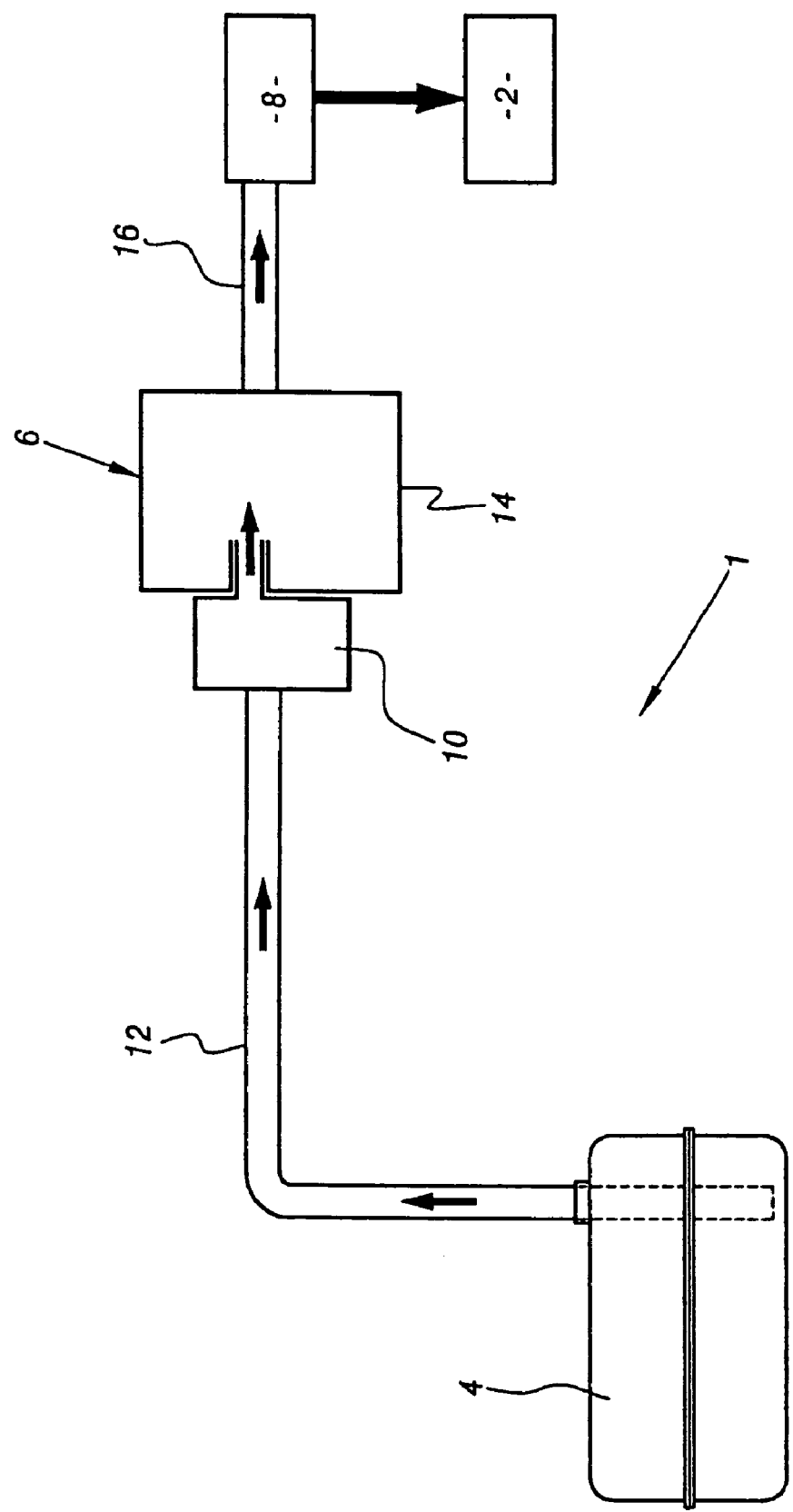
FIG. 1 is a diagrammatic view of a gas-oil supply line in accordance with the invention.

FIG. 1 shows a gas-oil supply line 1 for a diesel engine 2. The line 1 is a low pressure line, i.e. the gas-oil is displaced in this line, as indicated by the arrows, due to a depression at its downstream end relative to its upstream end. The line 1 includes, from upstream to downstream, a gas-oil tank 4, a device 6 for filtration of the gas-oil and a pump 8.

With the exception of the device 6, which will be described in detail hereinafter, the tank 4 and the pump 8 are elements known in themselves, which will not be firstly described in more detail.

Figure 2:
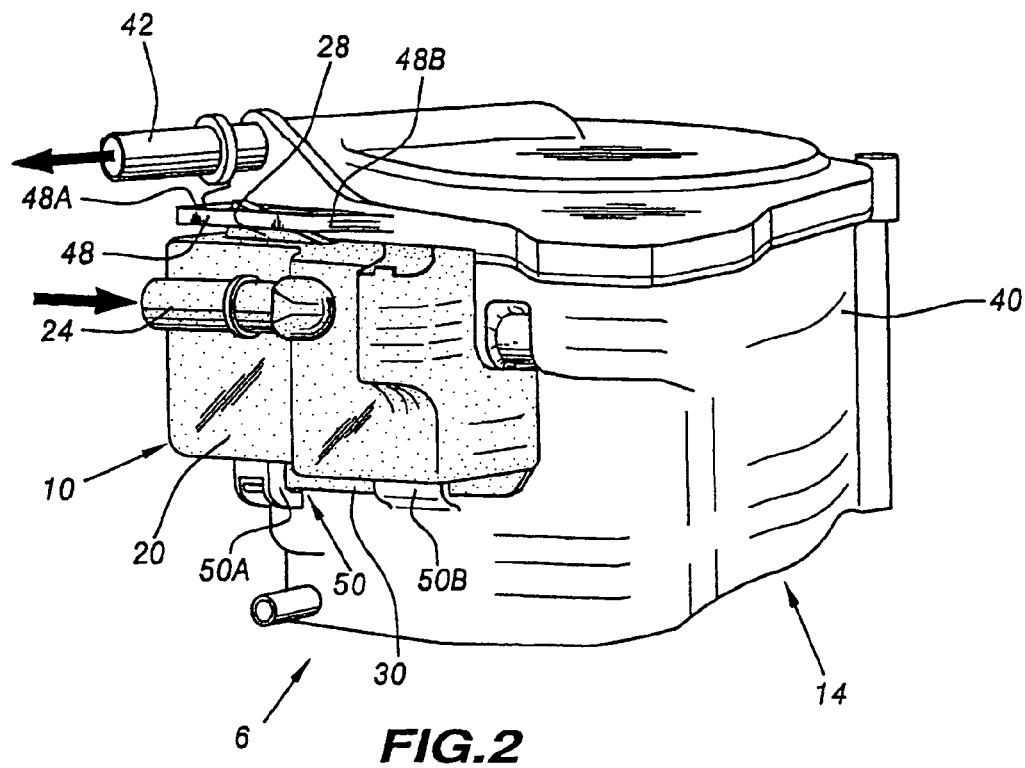
FIG. 2 is a perspective view of the filtration device in accordance with the invention.

As shown in FIGS. 1 and 2, the device 6 includes, on the one hand, a unit 10 for heating the gas-oil, connected to the tank 4 via a supply pipe 12, and, on the other, a unit 14 for filtration of the gas-oil from the heating unit and connected to the pump 8, via an evacuation pipe 16. In FIG. 2, the heating unit 10 is tinted grey relative to the filtration unit 14.

Figure 3:
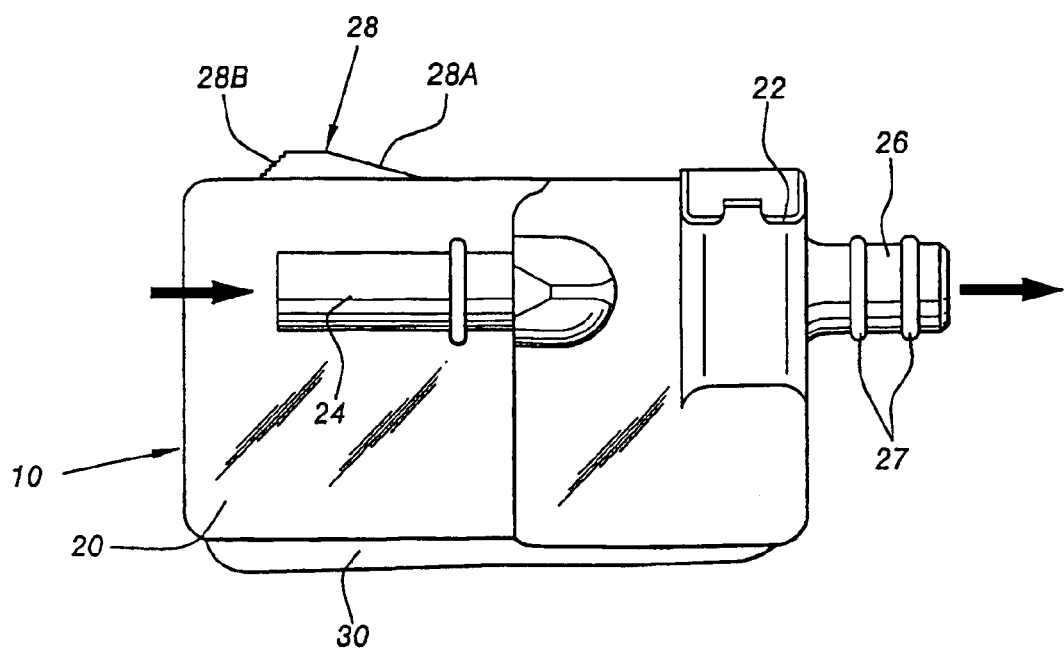
FIG. 3 is a frontal view of the heating unit of the device of FIG. 2.

As shown in more detail in FIG. 3, the heating unit 10 includes a casing 20 of substantially parallelepipedal general shape and defining internally a chamber for heating the gas-oil, not shown in the figures. For this purpose, the unit 10 includes internally one or more electrical heating elements. These units, known in themselves, are arranged in the heating chamber and electrically connected to an electrical connector 22. This connector is arranged on the casing 20 and intended to receive an electrical power supply cable, for example connected to a battery of accumulators.

The unit 10 externally includes a connecting sleeve 24 for intake of gas-oil to be heated into the heating chamber and a connecting sleeve 26 for outlet of the heated gas-oil, on which are arranged two O-ring seals 27. These sleeves extend in the longitudinal direction of the casing 20, the latter being for example made of rigid plastics material and the intake 24 and outlet 26 sleeves being moulded in one piece with the casing 20.

In addition, the casing 20 has notable external characteristics, of which account will be given hereinafter. Firstly, it includes a substantially flat longitudinal face; in the example shown, this is the face not visible in FIG. 3, opposite to the longitudinal face on which the intake sleeve 24 is arranged. In addition, its upper face includes, in its part most distant from the outlet sleeve 26, a protuberance 28. This protuberance includes, on the side of the outlet sleeve 26, a gentle slope 28A and, on the opposite side, a slope with notches 28B. In addition, the lower face of the casing 20 includes a longitudinal rail 30 of continuously decreasing thickness as it approaches the side of the outlet sleeve 26.

Figure 4:
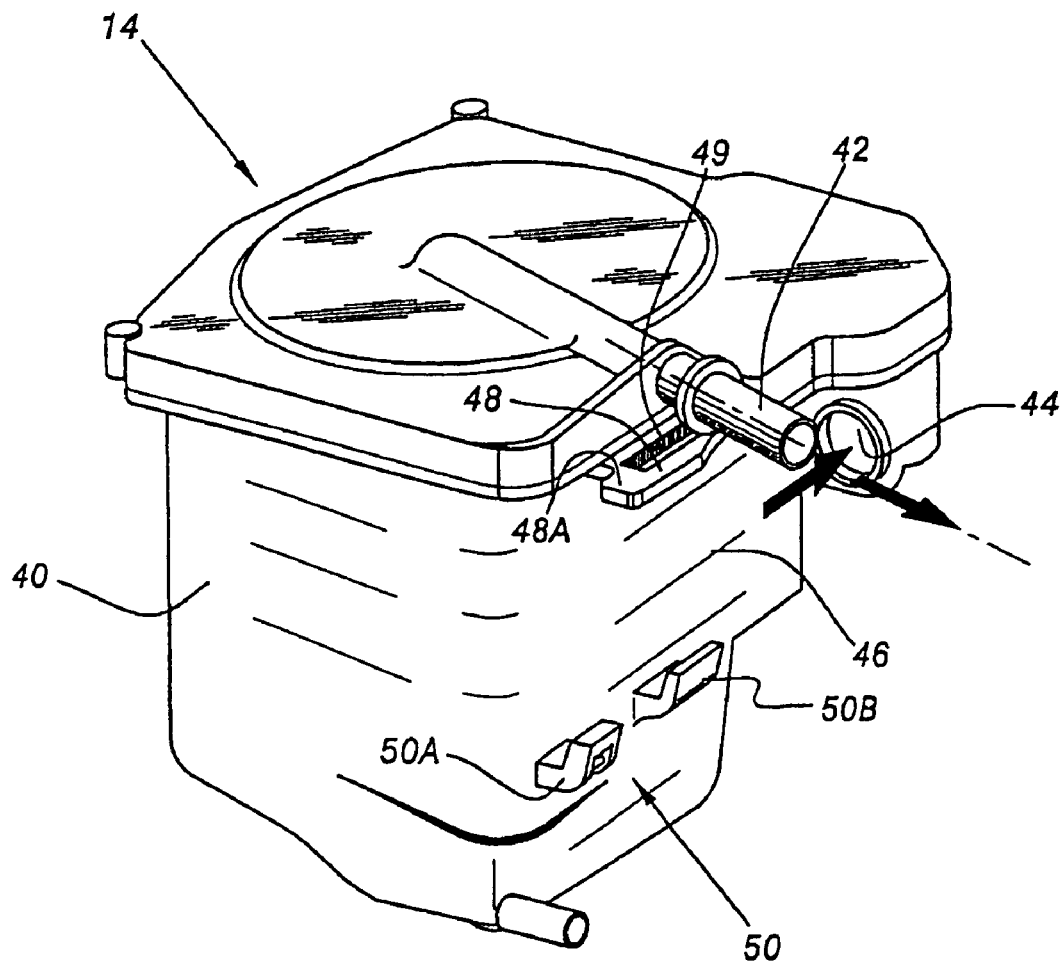
FIG. 4 is a perspective view of the filtration unit of the device of FIG. 2.

FIG. 4 shows in detail the filtration unit 14. This includes a casing 40 of substantially parallelepipedal general shape defining internally a chamber, not shown in the figures, for filtration the gas-oil. For this purpose, the unit 14 includes internally one or more filtration elements, such as paper, a Nylon mesh, etc . . . These elements are known in themselves and permit retention of solid impurities and/or water in emulsion contained by the gas-oil. Once these filtration elements are saturated, the whole of the filtration unit 14 should be exchanged with a new unit.

The unit 14 externally includes a sleeve 42 for outlet of the purified gas-oil, suitable to be connected to the evacuation pipe 16. In addition, a tubular orifice 44 is formed through the casing 40 so as to receive the outlet sleeve 26 of the heating unit 6.

The casing 40 of the filtration unit 14 is formed of a plastics material substantially similar to that of the casing 20 of the heating unit 10. By complementarity of shape, the casing 40 is suitable to support and detachably hold in place the casing 20. For this purpose, the casing 40 presents externally a substantially flat surface 46 of dimensions substantially complementary to those of the above-mentioned flat longitudinal face of the casing 20. In addition, the casing 40 includes a tab 48, providing a slot 49 for reception of the protuberance 28 of the casing 20. The tab 48 is connected to the casing by two arms 48A, 48B, at least one arm 48A of which, arranged substantially perpendicularly to the flat surface 46, is sectile, for example by means of suitable dimensioning. Moreover, the casing 40 includes a slideway 50 for sliding of the longitudinal rail 30 of the casing 20. In the example shown, the slideway includes two parts 50A and 50B, the part 50A substantially opposite the arm 48A being of stronger structure than the second part 50B.

Assembly of the casing 20 of the heating unit 10 with the casing 40 of the filtration unit 14 is effected in the following manner:

The heating unit 10 is firstly so positioned relative to the filtration unit 14 that the surface 46 of the casing 40 is substantially flush with the above-mentioned flat longitudinal face of the casing 20. Then, by a movement of translation of the heating unit 10 relative to the filtration unit 14, the longitudinal rail 30 of the casing 20, guided by the slideway 50 of the casing 40, causes the outlet sleeve 26 of the casing 20 to enter the tubular orifice 44 of the casing 40. This movement of translation is continued until the protuberance 28, which has previously lifted the tab 48 both by means of its gentle slope 28A and under the influence of raising of the casing 20 relative to the casing 40 caused by the increasing thickness of the rail 30, is housed inside the slot 49.

The rear arm 48A, relative to the direction of the preceding movement of translation, of the tab 48 is thus engaged with a notch of the notched slope 28B of the protuberance 28, then preventing the unit 10 from disengaging from the unit 14. The protuberance 28 thus forms a wedge for retaining the heating unit 10 in translation.

The heating 10 and filtration 14 units thus co-operate by complementarity of shape of their respective casings 20 and 40, so that the sleeve 26 and the orifice 44 form direct and tight means for connecting the heating and filtration chambers.

Once the filtration device 6 is assembled as described above, its operation and that of the supply line of FIG. 1 are as follows.

When the gas-oil is drawn into the low pressure line 1 by the downstream pump 8, the gas-oil enters the heating unit 10 where it is, if necessary, heated by the above-mentioned electric heating element or elements. The gas-oil leaves the heating chamber of the unit 10 following the connecting sleeve 26 between the units 10 and 14, and thus arrives directly in the filtration chamber of the unit 14. It leaves it again through the outlet sleeve 42 and follows the evacuation conduit 16 to the pump 8 and the diesel engine 2.

The filtration device in accordance with the invention is thus easy to install since, once the units 10 and 14 are fixed one to the other, it is connected to the line 1 like a standard single filtration element. Fixing of the heating unit to the filtration unit is, for its part, accomplished by a single movement of translation of the one relative to the other. The O-rings 27 provide good tightness of the connection between the two units, even in the presence of vibrations and/or slight axial misalignment between the sleeve 26 and the reception orifice 44.

To the extent that the sleeve 26 and the orifice 44 connect the heating and filtration chambers directly, the heated gas-oil suffers substantially no heat loss during its transfer from the heating chamber to the filtration chamber, moreover increasing the filtering performance of the unit 14.

In addition, when the filtration unit is saturated and ready to be discarded to be replaced by a new filtration unit, it is only necessary to cut the arm 48A of the tab 48. Breakage of the tab at the level of its sectile part 48A releases the wedge 28 and allows the heating unit 10 to be disengaged by a movement of translation in the opposite direction to that required to fix the heating unit onto the filtration one. The heating unit 10 is provided to have a longer life than that of the filtration unit 14, so it can be reused with several successive filtration units. These maintenance operations also have the advantage of being clean, since none of the casings of the units has to be opened. In addition, a filtration unit with a broken tab bears an obvious visual mark that it has already been used and can no longer hold a heating unit in place.

Figure 5:
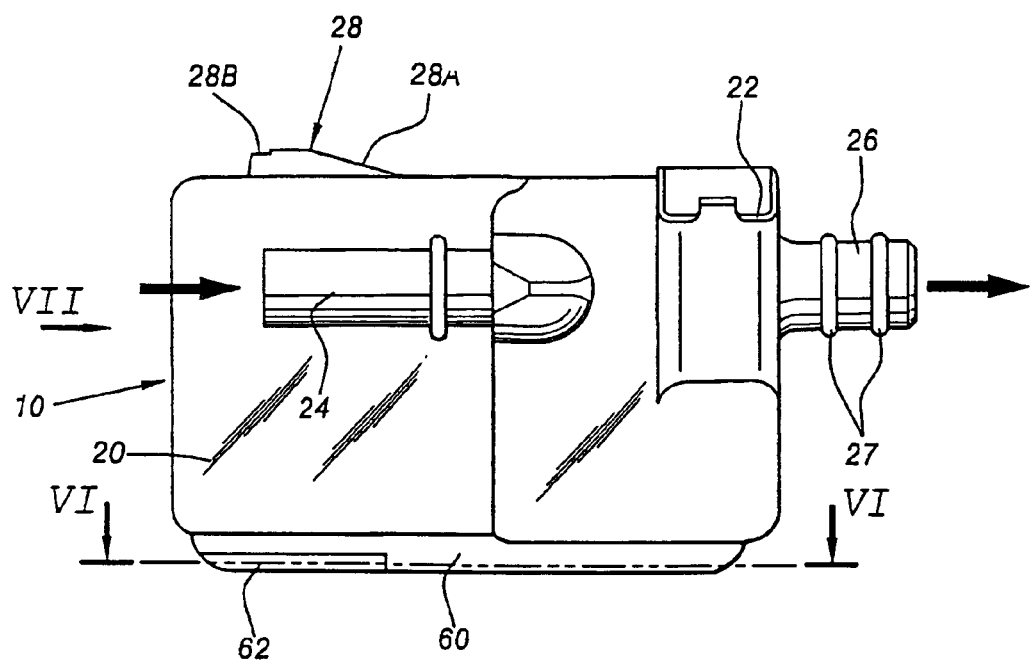
FIG. 5 is a view similar to that of FIG. 3, of a modified embodiment of the heating unit in accordance with the invention.
Figure 6:
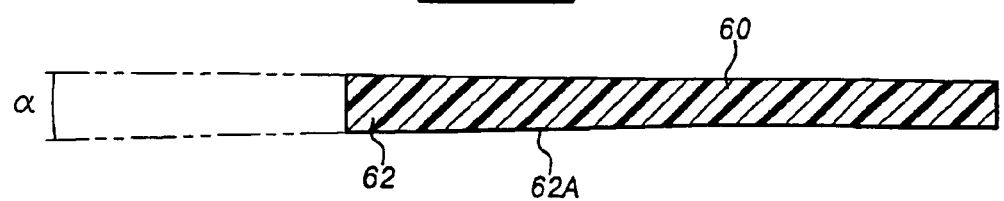
FIG. 6 is a view in section through the plane VI—VI indicated in FIG. 5.
Figure 7:
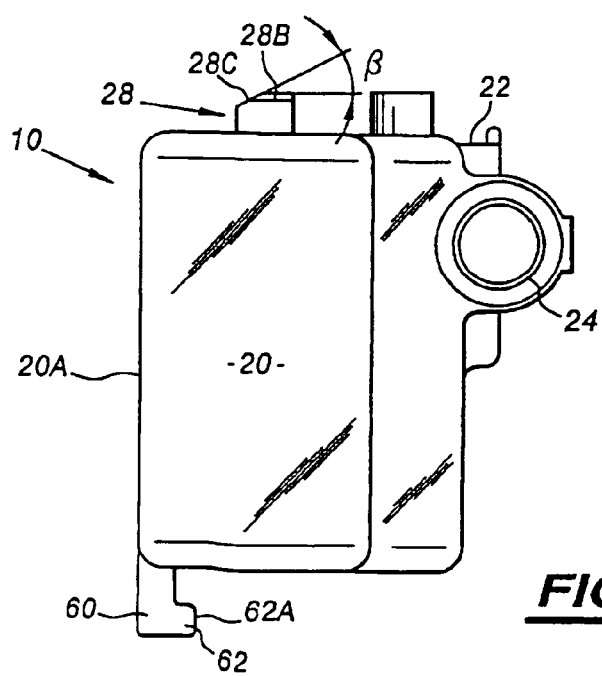
FIG. 7 is a view in the direction of arrow VII indicated in FIG. 5.

FIGS. 5 to 7 show a modification of the unit 10 for heating gas-oil of the filtration device 6 in accordance with the invention. The unit 10 of FIGS. 5 to 7 is only distinguished from that of FIGS. 2 and 3 by what follows.

In addition to the above-mentioned flat longitudinal face, visible in FIG. 7 and referenced 20A, the casing 20 of this heating unit 10 includes a lower longitudinal rail 60 suitable to slide, in the same manner as the rail 30 of FIGS. 2 and 3, in the slideway 50 of the casing 40 of the filtration unit 14. Differently from the above-mentioned rail 30, the rail 60 is of substantially constant thickness and includes a protuberance 62 formed on the part of the rail most distant from the sleeve 26. This protuberance is advantageously made in one piece with the rest of the rail 60. The face 62A, directed oppositely to the face 20A, of the protuberance 62 forms an angle, marked α, relative to the longitudinal direction of the rail 60, as shown in FIG. 6. This angle α is for example of the order of a few degrees.

In addition, the protuberance 28 of this modified embodiment of the heating unit includes one single notch 28B. The face 28C of the protuberance, intended to be turned towards the filtration unit 14, forms an angle of less than 90° with the substantially flat upper face of the protuberance 28. This angle is marked β in FIG. 7 and is advantageously 30°.

Assembly of the casing 20 of the heating unit 10, which has just been described, on the casing 40 of the filtration unit 14 is performed substantially as described with regard to FIGS. 2 to 4.

On the movement of translation of the heating unit 10 relative to the filtration unit 14, the lower rail 60 of the casing 20 is guided by the slideway 50 of the casing 40. Progressively as the protuberance 62, thus forming a ramp, is introduced into the strengthened part 50A of the slideway 50, this protuberance 62 causes the casing 20 to be offset transversally towards the casing 40.

Substantially concomitantly, the gentle slope 28A of the protuberance 28 lifts the tab 48 until the protuberance 28 is housed inside the slot 48 defining the edge of the slot 49 comes into abutment against the inclined face 28C of the protuberance 28, then forming a ramp able to transversally offset the casing 20, moving it away from the casing 40.

The transversal position of the casing 20 is fixed by combination of the above-mentioned movements of transversal offset both of the lower part of the casing 20 towards the casing 40 and of the upper part of the casing 20 in the opposite direction.

Once the heating 10 and filtration 14 units are assembled, the casing 20 is on the one hand retained in translation relative to the casing 40, as for the embodiment of FIGS. 2 to 4, and on the other retained transversally to the direction of translation relative to the casing 40.

The filtration device described with reference to FIGS. 5 to 7 has the advantage of being more robust, its fixing means having better mechanical resistance to vibration.

Various alternative embodiments of the filtration device in accordance with the invention can be envisaged to the extent that, although using totally distinct casings, i.e. not having a common wall, but of substantially complementary shapes, the heating unit and the filtration unit are connected directly and in tight manner to each other, for example by a short sleeve rigidly attached to one of the two units and essentially housed in the internal chamber of the other of these units.

Also, various forms of casings are possible, in order to functionally obtain an integrated filtration device, the respective casings of the heating and filtration units of which co-operate by complementarity of shape, as described with reference to the preceding figures.

Similarly, the means for fixing the heating unit onto the filtration unit are transposable, without departing from the scope of the invention, into means for fixing the filtration unit onto the heating unit. For example, the slide rail can be arranged on the casing of the filtration unit and the associated slideway is then arranged on the casing of the heating unit.

By way of modification, the casing 40 of the filtration unit 14 includes means for elastic retention of the wedge 28 of the casing 20 of the heating unit 10, for example a spring tab.

The invention claimed is:

1. Device for filtration of gas-oil intended to supply a diesel engine, comprising:
    an electric heating unit which includes a casing internally defining a chamber for heating the gas-oil to be filtered,
    a filtration unit which includes a casing internally defining a chamber for filtration of the heated gas-oil, and
    means for connecting the heating and filtration chambers, and
    means for assembly of the casings of the heating and filtration units,
    wherein the connecting means include means for direct and tight connection of the chambers of the said units, and
    wherein the assembly means include:
    means for detachable fixing of the casing of one of the heating and filtration units to the casing of the other of the said units, the casings of the said units co-operating by complementarity of shape, which fixing means comprise a sliding connection with a slideway between the heating unit and the filtration unit, and
    means for retention in translation of one of the said units relative to the other.

2. Device as described in claim 1, wherein the connecting means include a sleeve rigidly attached to the casing of one of the heating and filtration units, and an orifice for reception of the said sleeve formed in the wall of the casing of the other of the said units.

3. Device as described in claim 2, wherein the sleeve and the casing to which it is rigidly attached form a single piece.

4. Device as described in claim 2, wherein the connecting means are provided with sealing means.

5. Device as described in claim 2, wherein the movement of connecting the sleeve and the orifice for reception of the said sleeve is guided by the sliding connection with a slideway.

6. Device as described in claim 1, wherein the connection with a slideway provides an inclined ramp for sliding of one of the said units on the other.

7. Device as described in claim 1, wherein the means for retention in translation include a wedge rigidly attached to the casing of one of the said units, and a tab rigidly attached to the casing of the other of the said units, arranged transversally to the direction of translation and suitable to retain the wedge in translation when the casings of the said units are fixed one to the other.

8. Device as described in claim 7, wherein on the face of the wedge bearing on the tab when the casings of the said units are fixed one to the other, is formed at least one retaining notch.

9. Device as described in claim 7, wherein the wedge includes an inclined face for pushing back the tab at the movement of fixing of the heating unit onto the filtration unit.

10. Device as described in claim 7, wherein the tab includes a sectile part.

11. Device as described in claim 10, wherein the heating unit has a longer life than that of the filtration unit, a same heating unit being suitable to be connected successively in time to a plurality of filtration units.

12. Device as described in claim 1, wherein the fixing means include means for retention in a direction transversal to the direction of translation of one of the said units relative to the other.

13. Device as described in claim 12, wherein the transversal retention means include two ramps for transversal offsetting of one of the said units relative to the other, the respective directions of transversal offset of the said two ramps being opposite.

14. Gas-oil supply line, in particular for a diesel engine comprising a tank, a heating unit, a filtration unit and a gas-oil pump, wherein the heating and filtration units form a filtration device comprising:
    an electric heating unit which includes a casing internally defining a chamber for heating the gas-oil to be filtered,
    a filtration unit which includes a casing internally defining a chamber for filtration of the heated gas-oil, and
    means for connecting the heating and filtration chambers, and
    means for assembly of the casings of the heating and filtration units,
    wherein the connecting means include means for direct and tight connection of the chambers of the said units, and
    wherein the assembly means include:
    means for detachable fixing of the casing of one of the heating and filtration units to the casing of the other of the said units, the casings of the said units co-operating by complementarity of shape, which fixing means comprise a sliding connection with a slideway between the heating unit and the filtration unit, and
    means for retention in translation of one of the said units relative to the other.

* * * * *